United States Patent
Sendonaris (10) Patent No.: US 7,835,762 B2
(45) Date of Patent: Nov. 16, 2010

(54) ADJUSTING TRANSMIT POWER IN A WIRELESS COMMUNICATION SYSTEM

(75) Inventor: Andrew Sendonaris, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 43 days.

(21) Appl. No.: 10/282,990

(22) Filed: Oct. 28, 2002

(65) Prior Publication Data

US 2004/0002352 A1 Jan. 1, 2004

Related U.S. Application Data

(60) Provisional application No. 60/392,534, filed on Jun. 27, 2002.

(51) Int. Cl.
*H04B 7/00* (2006.01)
(52) U.S. Cl. .......................... 455/522; 455/68; 455/69; 455/456.1
(58) Field of Classification Search ................. 455/522, 455/69, 68, 456.1–456.6; 370/318
See application file for complete search history.

(56) References Cited

U.S. PATENT DOCUMENTS

| | | | | |
|---|---|---|---|---|
| 5,946,346 A | * | 8/1999 | Ahmed et al. ................ | 375/219 |
| 6,006,096 A | * | 12/1999 | Trompower .............. | 455/456.2 |
| 6,035,209 A | * | 3/2000 | Tiedemann et al. ......... | 455/522 |
| 6,263,205 B1 | * | 7/2001 | Yamaura et al. ............ | 455/442 |
| 6,377,813 B1 | * | 4/2002 | Kansakoski et al. ......... | 455/522 |
| 6,594,494 B1 | * | 7/2003 | Kakehi ....................... | 455/437 |
| 6,810,028 B1 | * | 10/2004 | Giallorenzi et al. ......... | 370/324 |
| 6,862,457 B1 | * | 3/2005 | Sarkar et al. ................ | 455/522 |
| 6,999,427 B1 | | 2/2006 | Usuda et al. | |
| 7,286,846 B2 | * | 10/2007 | Chen et al. .................. | 455/522 |
| 2001/0010686 A1 | | 8/2001 | Kubo et al. | |
| 2001/0050902 A1 | | 12/2001 | Asanuma | |

FOREIGN PATENT DOCUMENTS

| | | | |
|---|---|---|---|
| EP | 1233541 | | 8/2002 |
| JP | 2001-359145 | | 12/2001 |
| WO | WO 00/33478 | * | 6/2000 |
| WO | 0131824 | | 5/2001 |

OTHER PUBLICATIONS

International Search Report—PCT/US03/020405, International Searching Authority—European Patent Office, Jan. 16, 2004.
Written Opinion—PCT/US03/020405—IPEA/US, Alexandria, VA, Apr. 26, 2004.

\* cited by examiner

*Primary Examiner*—Nay A Maung
*Assistant Examiner*—Richard Chan
(74) *Attorney, Agent, or Firm*—Linda G. Gunderson (57) ABSTRACT

A method and apparatus are provided for determining adjustments to be made to a transmitter based on the velocity or location of a wireless communication device in relation to a wireless network infrastructure. The transmitter to be adjusted can be located in either the wireless communication device, or in a device in the wireless communication infrastructure, or both.

30 Claims, 6 Drawing Sheets

ADJUSTING TRANSMIT POWER IN A WIRELESS COMMUNICATION SYSTEM

RELATED APPLICATIONS

This application claim priority to U.S. Provisional Application Ser. No. 60/392,534 filed on Jun. 27, 2002.

BACKGROUND

1. Field

The disclosed subject matter relates generally to wireless communication. In particular, the disclosed subject matter relates to power control of signals transmitted in wireless communication systems.

2. Description of the Related Art

Communication over a wireless channel can be accomplished using a variety of techniques which facilitate a large number of users in a limited frequency spectrum. These techniques, commonly referred to as multiple access techniques, include time division multiple access (TDMA), frequency division multiple access (FDMA), and code division multiple access (CDMA).

CDMA offers many advantages over other modulation techniques used in wireless communication systems such as TDMA and FDMA. For example, CDMA permits the frequency spectrum to be reused multiple times, thereby permitting an increase in system user capacity. Additionally, use of CDMA techniques permits the special problems of the terrestrial channel to be overcome by mitigation of the adverse effects of multipath, e.g. fading, while also exploiting the advantages thereof.

In CDMA and other wireless communication technologies, it is often desirable to increase the number of simultaneous users the communication system can accommodate. A technique that is often used to increase the number of simultaneous users is to adjust the power of the signal transmitted by a wireless communication device (WCD) so as to decrease its interference with signals transmitted by other WCDs. If the power of the signal transmitted by a WCD is adjusted so the signal-to-interference ratio is at a minimal acceptable level when the signal is received at its desire destination then the system capacity can be increased. Because signals transmitted by one WCD will interfere with signals transmitted by other WCDs, decreasing the power of signals transmitted by a WCD will decrease the overall interference in the system and thus the system capacity can be increased. For example, if there are multiple WCDs communicating with a base station, the number of WCDs that can simultaneously communicate will be maximized if all of the WCDs decrease the power of their transmitted signals to a minimum level while still maintaining sufficient power to achieve a minimum signal-to-interference ratio at the base station receiver.

There is therefore a need in the art for techniques to provide improved power control of signals transmitted between WCDs and base stations in a wireless communication system.

SUMMARY

The presently disclosed subject matter provides a method and apparatus for determining adjustments to a transmitter in a wireless communication system based on a location, a velocity, or both, of a wireless communication device (WCD) in relation to a wireless network infrastructure, such as a base station. Aspects of the disclosed subject matter include determining the location, the velocity, or both, of the WCD and determining adjustments to be made to a transmitter based on the location or the velocity, or both. The transmitter to be adjusted can be located at various locations in the communication system. For example, the transmitter in a WCD can be adjusted, or the transmitter at various nodes of the wireless network infrastructure (referred to as simply "infrastructure") can be adjusted. Determining the location or the velocity of the WCD, and determining adjustments to the transmitter, can be performed at various locations within the infrastructure, in the WCD, or in any combination thereof.

For example, in one embodiment, the WCD determines its location, velocity, or both, and determines transmitter adjustments based on the location or velocity. In a second embodiment, the infrastructure determines the location, the velocity, or both, of the WCD, and determines transmitter adjustments based on the location or velocity of the WCD. In a third embodiment, the WCD determines its location, velocity, or both, and transmits the information to the infrastructure. The infrastructure then determines transmitter adjustments based on the location or velocity of the WCD. In a fourth embodiment, the infrastructure determines the location, velocity, or both, of the WCD and transmits the information to the WCD. The WCD then determines transmitter adjustments based on the location or velocity.

The adjustments can be used to adjust a transmitter in either the WCD or the wireless network infrastructure. For example, if the adjustments to be made to a transmitter are determined in the WCD, then the WCD can use the adjustments to adjust its transmitter, or the adjustments can be transmitted to the infrastructure and a transmitter in the infrastructure can be adjusted. Similarly, if the adjustments to be made to a transmitter are determined in a device of the infrastructure, then the infrastructure device can use the adjustments to adjust its transmitter, or the adjustments can be transmitted to the WCD and the transmitter in the WCD can be adjusted.

An aspect of the disclosed subject matter is determining adjustments to a transmitter in a wireless communication system, such as, adjusting the power level of a signal transmitted by the transmitter, to provide an improvement in the interference level of the communication channel through which the signal is transmitted. Other aspects of the disclosed subject matter include varying an integration interval used to measure the power level of a received signal and determining a power control loop update frequency based on the velocity of the WCD.

Other features and advantages of the presently disclosed subject matter should be apparent from the following description of the preferred embodiment which illustrates, by way of example, principles of the claimed invention.

DETAILED DESCRIPTION

In accordance with the presently disclosed subject matter a power control technique is described that determines adjustments to a transmitter in a wireless communication system based on the location, the velocity, or both, of a wireless communication device (WCD) with which communication is taking place. Typically, both WCDs and wireless network infrastructure devices, such as base stations, include transmitters and receivers. In accordance with the presently disclosed subject matter, adjustments to these transmitters and receivers can be based on the location or velocity of a mobile WCD. The determined adjustments can be, for example, adjustments to the power level of signals transmitted by devices in a wireless communication system, adjusting an integration interval, or period, used to measure the power level of a received signal, and selecting a power control loop frequency.

A wireless communication system may include mobile WCDs that are in communication with a wireless network infrastructure. As the WCDs move about their distance from the receivers and transmitters in the infrastructure changes. Signals transmitted between WCDs and the infrastructure are attenuated, lose power, as they propagate through the wireless channel. Signal propagation loss can vary from an inverse second-power to an inverse fourth-power, depending on the environment the WCD is operating in. For example, in an urban environment a typical propagation loss may be about an inverse three and a third-power. One source of propagation loss is geometric spreading, i.e. energy loss as a wavefront expands as it travels so that the energy is distributed over a larger volume. Thus, as a WCD moves closer and further from the infrastructure, the amount of attenuation the signal experiences varies. If the transmit power level of a signal is constant, variations in the amount of attenuation results in variations in the received power level of the signal as the WCD moves about. It is desirable to maintain an approximately constant, minimum power level for signals received by both the WCDs and the infrastructure to decrease the overall interference in the communication network.

In addition to signal attenuation due to spreading, a wireless communication channel typically exhibits a phenomenon commonly referred to as "multipath." In a wireless communication channel a transmitted signal may travel multiple different paths, or multipaths, as the signal propagates between a transmitter and a receiver. These multipath signals may be caused, for example, by reflection off of obstacles, such as buildings, bridges, people, and other obstacles as the signal travels from the transmitter to the receiver. These reflected, or multipath, signals result in the same signal being received as multiple instances of the signal, delayed in time and phase from each other. Because these multipath signals are no longer in phase when they recombine at the receiver they can result in a lower signal level commonly referred to as a "fade." The power of the signals transmitted and received between a WCD and the infrastructure can change over time as the WCD, the obstacles, or both, move about causing the paths traveled by the multipath instances of the transmitted signal to change.

Determining the location, or velocity, of the WCD can be performed in many different ways. For example, an indication of the WCD location or velocity can be received from a navigational receiver, such as a Global Positioning System (GPS) receiver, or other types of navigational receiver. In addition, the WCD velocity can be determined from at least two measurements of the location of the WCD that are made at different, known, times. The velocity can be determined from the WCD location measurements and their respective measurement times. Location measurements can be complete location solutions or measurements that are used to compute a location solution. For example, the WCD may make pseudorange measurements from GPS satellites, and transfer the pseudorange measurements and the measurement times, to the wireless network infrastructure where the pseudorange measurements and GPS information gathered from a GPS receiver at the network are combined to determine the location and velocity of the WCD. In another example, the network infrastructure can make measurements on signals received form the WCD and determine location measurements of the WCD at different times. The network infrastructure can determine the velocity of the WCD or the network can transmit the location measurement, and respective measurement times, to the WCD where a velocity is determined.

In the description below, various aspects of the presently disclosed subject matter are described in terms of a wireless communication system based on CDMA. Aspects of the presently disclosed subject matter may also be used in conjunction with other communication technologies.

Figure 1:
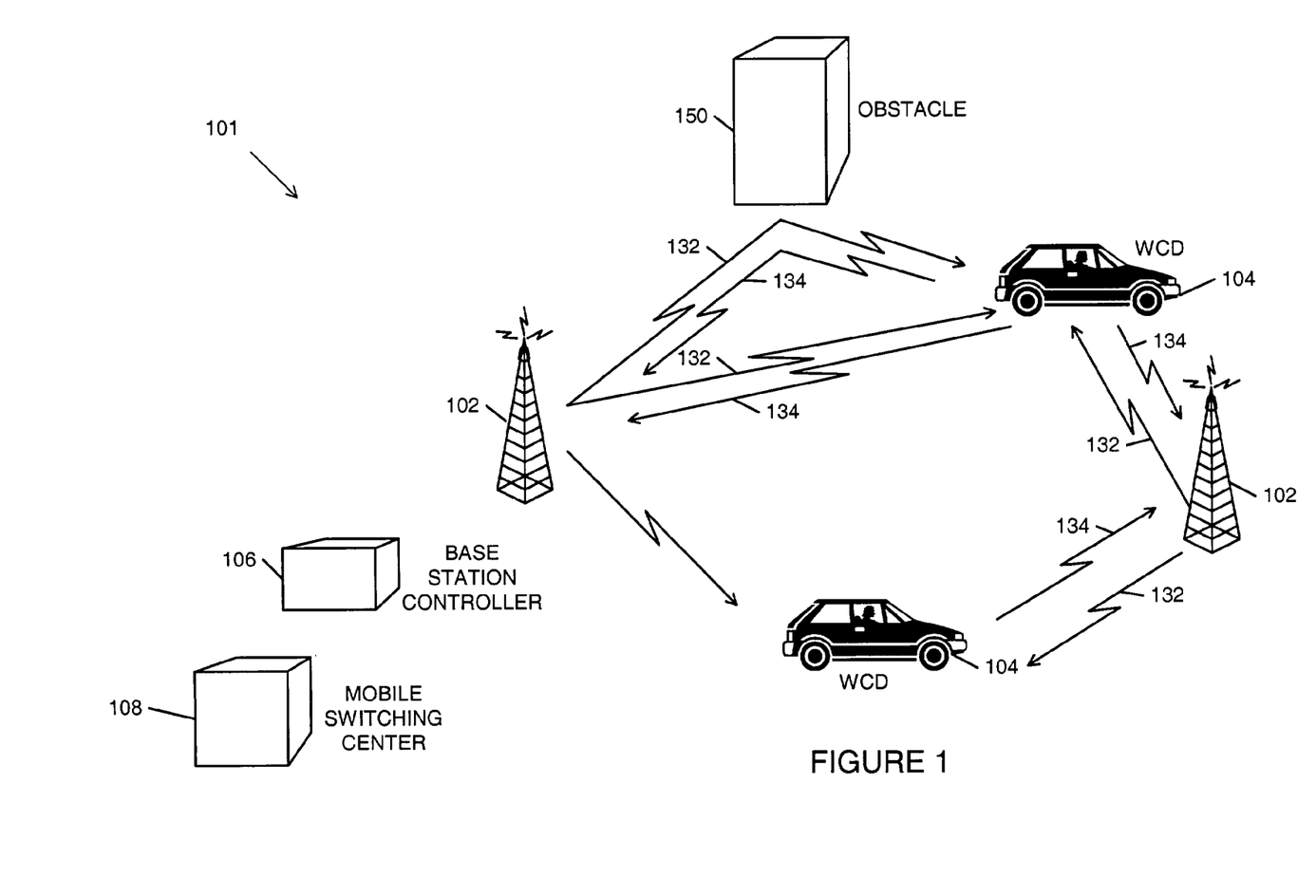
FIG. 1 is a block diagram illustrating portions of a wireless communication system that operates in accordance with the presently disclosed subject matter.

FIG. 1 is a block diagram illustrating portions of a wireless communication system 101 that operates in accordance with the presently disclosed subject matter. The wireless communication system includes a wireless network infrastructure with multiple base stations 102, and multiple mobile WCDs 104. The wireless network infrastructure also includes other components, such as base station controllers 106, mobile switching centers 108, and the like. Signals 132 transmitted from a base station 102 to a WCD 104 are referred to as the forward link. Signals 134 transmitted from a WCD 104 to a base station are referred to as the reverse link. As illustrated in FIG. 1, both the forward link and the reverse link can travel different, multiple paths between a base station 102 and a WCD 104. As shown in FIG. 1, forward and reverse link signals may be reflected off an obstacle 150 resulting in multiple instances of the signal being received at the base station 102 and at the WCD 104. This condition is commonly referred to as "multipath" signals.

Examples of WCDs 104 include cellular telephones, satellite telephones, wireless communication enabled personal computers and personal digital assistants (PDA), and other wireless devices. The wireless communication system 101 may be designed to support one or more wireless standards. For example, the standards may include TIA/EIA-95-B (IS-95), TIA/EIA-98-C (IS-98), $3^{rd}$ Generation Partnership Project (3GPP); $3^{rd}$ Generation Partnership Project 2 (3GPP2), cdma2000, Wideband CDMA (WCDMA), and others.

In accordance with the presently disclosed subject matter, knowledge of the location, the velocity, or both, of a mobile WCD, or mobile terminal, in a wireless communication system is utilized to improve the power control for transmitters in the WCD, or transmitters in the wireless network infrastructure, or both. For example, a WCD can measure the power of a signal it receives that was transmitted to it from a transmitter in the infrastructure. Based on the measurement, the WCD can determine if it would be desirable to adjust the power level at which the signal was transmitted. The WCD can then send a signal representing the power measurement or a signal requesting a change in the transmit power level to the infrastructure. The infrastructure can then adjust its transmitter to either increase or decrease the power level of the transmitted signal based on the signal sent by the WCD. Likewise, a receiver in the infrastructure can measure the power of the signal it receives that was transmitted to it from a transmitter in a WCD. Based on the measurement, the infrastructure can determine if it would be desirable to adjust the power level at which the signal was transmitted. The infrastructure can then send a signal representing the power measurement or a signal requesting a change in the transmit power level to the WCD. The WCD can then adjust its transmitter to either increase or decrease the power level of the transmitted signal based on the signal sent by the infrastructure.

Knowledge of the location of a WCD can be used to estimate the attenuation a signal will experience during transmission between the WCD and infrastructure. Knowledge of the estimated power loss can be used to adjust the transmit power level of a signal transmitted between the WCD and the infrastructure. For example, knowledge of the location of the WCD in relation to the infrastructure can indicate a better or worse situation for multipath at the WCD. The infrastructure can use the indication of the multipath situation at the WCD to estimate the transmit power level that it should use in transmitting a signal to the WCD. Likewise, the WCD can estimate the transmit power level that it should use in transmitting a signal to the infrastructure. Estimating the transmit power level reduces the bandwidth required for power adjustments in the communication system. Reducing the bandwidth required for power control reduces the bandwidth required to support communication with a particular WCD and thereby increases the overall capacity of the communication system.

Knowledge of the velocity, i.e. the speed and direction, of the WCD can be used to improve the determination of a desired power level for a transmitted signal. For example, based on the velocity of the WCD the period of integration used to measure the power level of a received signal can be adjusted. In addition, knowledge of the WCD velocity can be used to determine a desired update rate, or frequency, of a power control loop.

Adjusting the integration interval, or period, used in measuring the power level of a received signal can result in an improvement in power control. For example, if a WCD is moving quickly then it is likely that the wireless channel conditions are changing rapidly. Rapid changes in the wireless channel conditions would make older measurements less reliable in estimating the current channel conditions. Thus, it may be advantageous to decrease the integration period and thereby give older measurements less weight in determining the desired transmit power. In some cases, it might be that no integration at all will be performed, with just a single sample taken to measure the received power.

On the other hand, if the WCD is moving slowly, then it is likely that conditions in the wireless channel are changing slowly. Slowly changing channel conditions would make older measurements more reliable in estimating the current channel conditions. Thus, in that situation, it may be advantageous to increase the integration period and thereby give older measurements more weight in determining the desired transmit power. Increasing the integration period makes the power control adjustment less susceptible to short-term fluctuations in the received power level.

The measurement of the power of a received signal, and the determination of a desired transmit power, can be performed in different locations. For example, a WCD can measure the power of a received signal and based on that measurement the WCD can determine a desired transmit power level. Alternatively, the WCD can measure the power level of a received signal and transmit a signal representing this measurement to the infrastructure, where a desired transmit power level is determined, or the WCD can transmit a signal requesting a change in the transmit power level. Likewise, the infrastructure can measure the power of a received signal and determine a desired transmit power level. Or the infrastructure can measure the power level of a received signal and transmit a signal representing this measurement to a WCD, where a desired transmit power level is determined, or a signal requesting a change in the transmit power level can be produced.

Knowledge of the velocity of a WCD can also be used to determine a desired update rate, or frequency, of a power control loop. For example, in WCDMA two different power control loop frequencies are supported, 500 Hz and 1500 Hz. As noted, if a WCD is moving rapidly the wireless channel conditions are likely to be changing rapidly. If the channel conditions are changing rapidly, a higher update frequency control loop might not be fast enough to track the changes. In this situation it may be preferred to use a lower update frequency control loop and track the overall trend rather than attempt to track the short-term fluctuations.

On the other hand, if the WCD is moving slowly then it is likely that the wireless channel is changing slowly. It may be possible to track the slowly changing channel conditions with the lower update frequency power control loop. It is advantageous to use a lower frequency power control loop because it requires less of the communication bandwidth to send power control commands between the WCD and the infrastructure, freeing the bandwidth up for other uses. Actual values of velocity that determine the operation changes can be determined according to system design considerations.

If the WCD is moving at an intermediate speed then the wireless channel is likely to also be changing at an intermediate rate. In this situation a higher update frequency power control loop may be able to track the changes in the conditions. If the higher update frequency power control loop can track the changing channel conditions, then overall performance of the communication system should be improved. If the high update frequency power control loop is, for example, 1500 Hz as in WCDMA, then a WCD that is moving in the range of 50 to 100 kmph may be able to advantageously use the higher update frequency power control loop rather than a lower update WCDMA frequency at 500 Hz. Different update frequency power control loops could be used for different WCD velocities. Considerations in selecting the update frequency of the power control loop will be known to those skilled in the art.

The techniques described can also take advantage of knowing the direction in which the WCD is moving. Knowing the velocity of the WCD provides information about the speed and the direction of the WCD in relation to a device of the infrastructure and can be used to predict what future transmit power level may be desired. If a WCD is moving closer to the infrastructure device then, in general, the signals transmitted between the WCD and infrastructure device will be attenuated less as the distance between the WCD and the infrastructure decreases. Knowing the speed and direction of the WCD in relationship to the infrastructure can be used to predict what future power levels of transmitted signals would be desired. For example, if the WCD is moving slowly in a direction toward the infrastructure, it can be anticipated that the signals transmitted between the WCD and the infrastructure will experience less attenuation in the future. Likewise, if the WCD is moving at a high speed toward the infrastructure, it can be anticipated that signals transmitted between the WCD and the infrastructure will still experience decreased attenuation in the future and the decrease in attenuation will occur at a higher rate. The control of the power of signals transmitted between the WCD and the infrastructure can be adapted to take this varying rate of attenuation into account.

Similarly, if the WCD is moving away from the infrastructure at varying speeds and directions, signals transmitted between the WCD and the infrastructure will experience more attenuation at different rates in accordance with the different speeds and directions. Again, control of the power of signals transmitted between the WCD and the infrastructure can be adapted to take this varying rate of attenuation into account.

Figure 2:
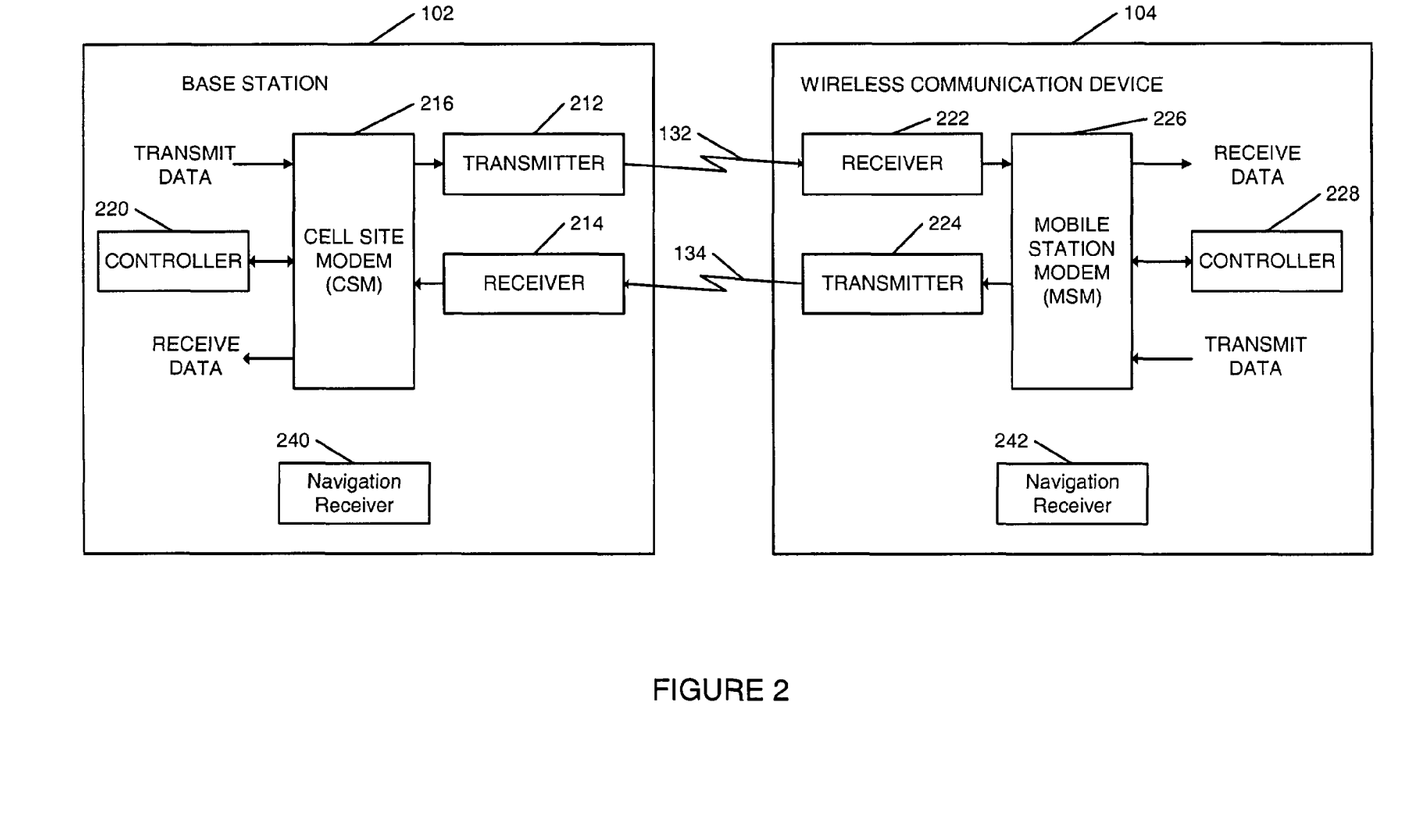
FIG. 2 is a block diagram illustrating additional detail of portions of the wireless communication system.

FIG. 2 is a block diagram illustrating additional detail of portions of the wireless communication system 101 shown in FIG. 1. FIG. 2 further illustrates a base station 102 and a WCD 104 from FIG. 1. Included in the base station 102 is a transmitter 212, a receiver 214, a cell site modem (CSM) 216, and a controller 220. The WCD 104 includes a receiver 222, a transmitter 224, a mobile station modem (MSM) 226, and a controller 228.

To determine the velocity of the WCD, a base station 102 can include a navigation receiver 240, or the WCD 104 can include a navigation receiver 242, or both the base station 102 and the WCD 104 can include navigation receivers 240, 242 respectively. Examples of navigation receivers that may be included in the base station 102 and the WCD 104 include GPS receivers, LORAN receivers, GLONASS receivers, systems that use the network infrastructure to determine the speed of a WCD, and hybrid systems that use various combinations of navigation receivers. The controllers 220 and 228 in the base station 102 and the WCD 104 can be configured to receive information about the velocity of the WCD and to determine adjustments to be made.

Figure 3:
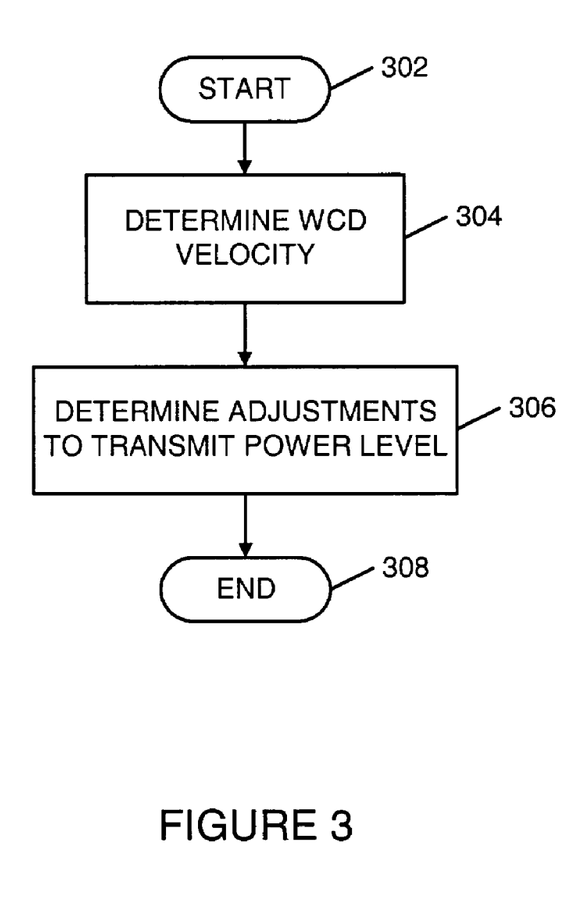
FIG. 3 is a flow diagram illustrating a technique for adjusting the transmit power of a transmitter in a wireless communication system.

FIG. 3 is a flow diagram illustrating a technique for adjusting the transmit power of a transmitted in a communication system. Flow begins in block 302. In block 304 a location of a WCD in relation to the infrastructure is determined. As noted above, WCD location can be determined in the WCD or in the infrastructure. Block 304 includes multiple location determinations, so that velocity (direction and speed) of the WCD can be determined Flow continues to block 306 where desired adjustments to be made to the transmit power level of a transmitter are determined based on the location and speed of the WCD. The adjusted transmitter can be in the WCD or in the infrastructure or both. Flow stops in block 308. As noted, the adjustments can be used to adjust a local transmitter or the adjustments can be sent to another location to adjust a transmitter at the other location. For example, if a WCD determines the adjustments, the WCD can adjust its own transmitter or it can send the adjustments to a device in the infrastructure for use in adjusting a transmitter in the infrastructure. Likewise, if a device in the infrastructure determines the adjustments, then the adjustments can be used to adjust a transmitter in the infrastructure or the adjustments can be transmitted to a WCD and the WCD can adjust its transmitter accordingly.

Figure 4:
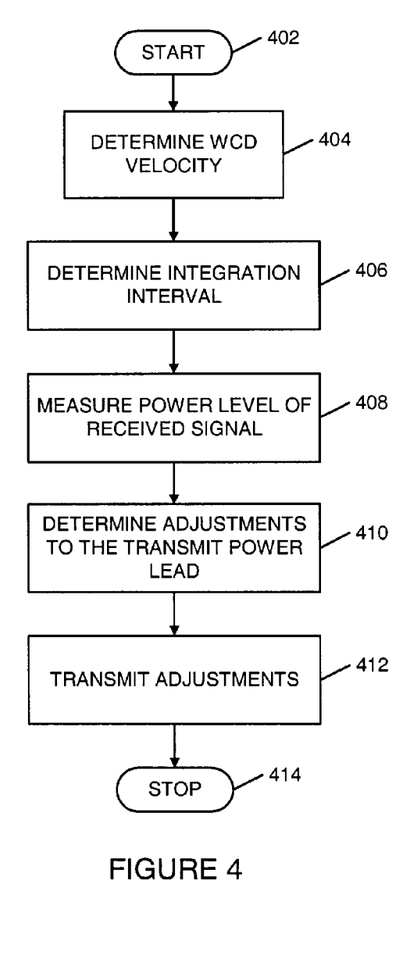
FIG. 4 is a flow diagram illustrating another technique for adjusting the transmit power of a transmitter in a wireless communication system.

FIG. 4 is a flow diagram illustrating another technique for adjusting the transmit power of a transmitter in a communication system. Flow begins in block 402. Flow continues to block 404 where a velocity of a WCD is determined. Flow then continues to block 406. In block 406 an integration interval used to measure the power level of a received signal is determined based on the velocity of the WCD. The received signal can be a signal received in a WCD or in an infrastructure device. Flow then continues to block 408 where the power level of the received signal is measured using the determined integration interval. Flow then continues to block 410. In block 410 adjustments to the transmit power level of the transmitter that transmitted the received signal are determined. Flow continues to block 412 where the determined adjustments are transmitted. The adjustments can be used in adjusting the transmit power level of the transmitter that transmitted the received signal. For example, if the adjustments are determined in the WCD, then the adjustments may be transmitted to the infrastructure for use in adjusting a transmitter in the infrastructure. Likewise, if the adjustments are determined in the infrastructure, then the adjustments can be transmitted to a WCD for use in adjusting a transmitter in the WCD. Flow then stops in block 414.

Figure 5:
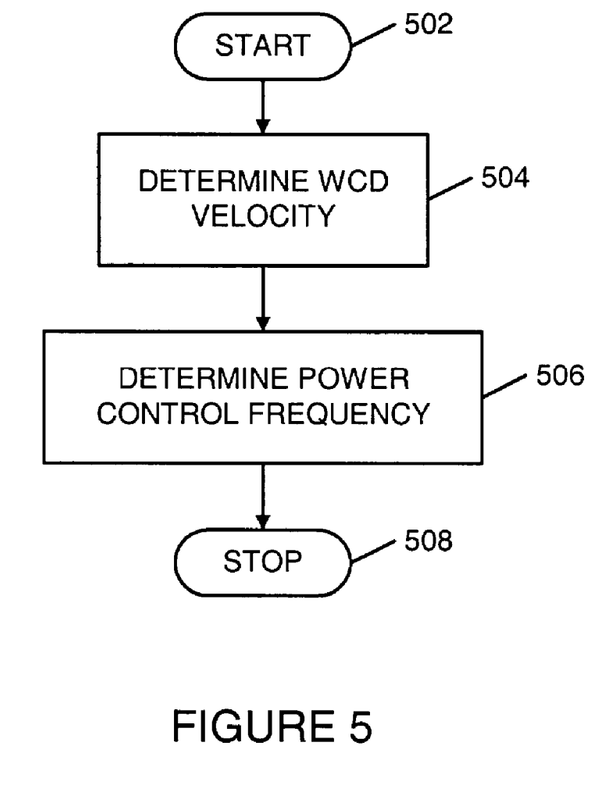
FIG. 5 is a flow diagram illustrating a technique for selecting a power control frequency in a wireless communication system.

FIG. 5 is a flow diagram illustrating a technique for selecting a power control update frequency in a communication system. Flow begins in block 502. Flow continues to block 504 where velocity of a WCD is determined. As described previously, the determination can be performed in the WCD or in the infrastructure. Flow then continues to block 506 where a power control update frequency is determined based on the velocity of the WCD. As noted above, some of the considerations that influence update frequency are the rate of change of the channel conditions and the update frequencies supported. For example, in WCDMA two different power control frequencies are supported, either 500 Hz or 1500 Hz. Based on the velocity of the WCD, a desired one of these two power control update frequencies can be selected. This technique is not limited to these two frequencies but may be adapted to select any desired power control update frequency. The velocity at which the update frequency is changed will depend on the characteristics of the system, the signal characteristics, and the channel conditions, and can be determined, for example, by field testing, or system modeling. Flow stops in block 508.

Figure 6:
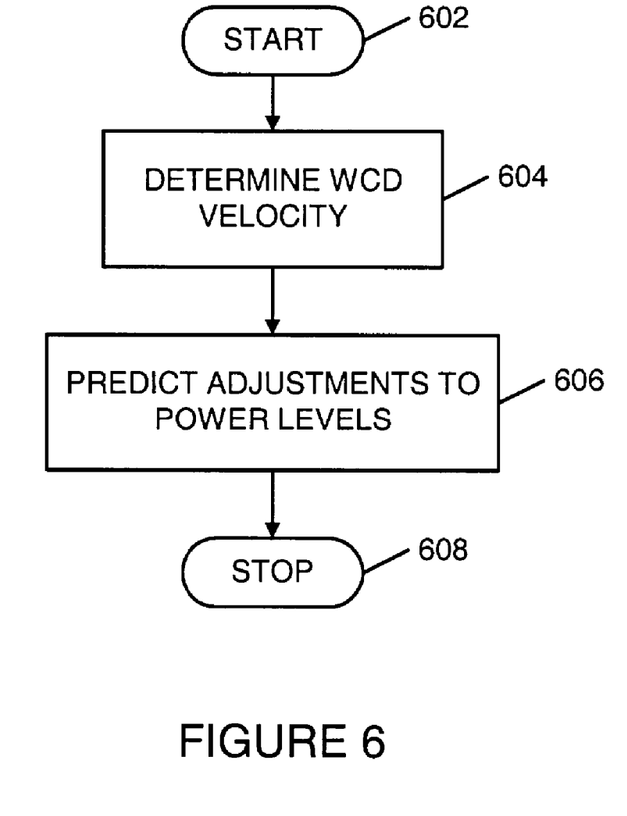
FIG. 6 is a flow diagram illustrating another technique for adjusting the transmit power of a transmitter in a wireless communication system.

FIG. 6 is a flow diagram illustrating another technique for adjusting the transmit power of a transmitter in a communication system. Flow begins in block 602. Flow continues to block 604 where velocity, i.e. speed and direction, of a WCD is determined. Flow then continues to block 606. In block 606 a prediction of future received signal power and desired power level adjustments is made based on the speed and direction of the WCD in relation to the infrastructure. As noted above, the prediction with respect to received signal power might be simply the recognition that power will be increasing, or decreasing. Alternatively, more precise predictions can be made if desired. Flow stops in block 608. The predicted adjustments can be used to adjust a local transmitter or the predicted adjustments can be sent to another location to adjust a transmitter at the other location. For example, if a WCD determines the adjustments, then that WCD can adjust its own transmitter or it can send the predicted adjustments to a device in the infrastructure for use in adjusting a transmitter in the infrastructure. Likewise, if a device in the infrastructure determines the adjustments, then the adjustments can be used to adjust a transmitter in the infrastructure or the adjustments can be transmitted to a WCD and the WCD can adjust its transmitter.

The foregoing description details certain embodiments of the presently disclosed subject matter. It will be appreciated, however, that no matter how detailed the foregoing appears, the claimed invention may be embodied in other specific forms without departing from spirit or essential characteristics of the claimed invention. The described embodiments are to be considered in all respects only as illustrative and not restrictive. The scope of the claimed invention is, therefore, indicated by the appended claims only, rather than by the presently disclosed subject matter detailed above. All changes which come with the meaning and range of equivalency of the claims are to be embraced within their scope.

I claim:

1. A method of controlling transmitted power in a wireless communication system, the method comprising:
   determining a velocity ity of a wireless communication device in relation to a device located in a wireless network infrastructure;
   measuring a power level of a signal of the wireless communication system received over a wireless channel between the wireless communication device and the device located in the wireless network infrastructure;
   determining adjustments to a transmit power level at which the signal of the wireless communication system is transmitted in accordance with the determined velocity of the wireless communication device;
   selecting between a first power control loop update frequency if the determined velocity satisfies a first predetermined criteria and a second power control loop update frequency if the determined velocity satisfies a second predetermined criteria, wherein the first predetermined criteria is that the velocity is equal to or less than a first velocity, and the second predetermined criteria is that the velocity is equal to or greater than a second velocity, and wherein the first power control loop update frequency is greater than the second power control loop update frequency; and
   providing the adjustments and the selected one of first and second power control loop update frequencies to a transmitter of the signal.

2. A method as defined in claim 1, wherein determining the adjustments to the transmit power level results in a desired received signal power level.

3. A method as defined in claim 1, further comprising determining an integration interval to be used in measuring the power level of the signal of the wireless communication system based on the determined velocity.

4. A method as defined in claim 1, wherein determining the velocity, measuring the power level, determining the adjustments to the transmit power level, and providing the adjustments to the transmitter are performed in the wireless communication device.

5. A method as defined in claim 1, wherein determining the velocity, measuring the power level, determining the adjustments, and providing the adjustments to the transmitter are performed in the wireless network infrastructure.

6. A method as defined in claim 1, wherein the velocity of the wireless communication device is determined based on information from a navigational receiver.

7. A method as defined in claim 6, wherein the navigational receiver is a Global Positioning System receiver.

8. A method as defined in claim 1, wherein the velocity of the wireless communication device is determined in accordance with at least two location measurements of the wireless communication device, wherein the at least two location measurements are made at different, known times, and the velocity of the wireless communication device is based on the at least two location measurements and their respective measurement times.

9. A method of controlling transmitted power in a wireless communication system, the method comprising:
   determining a velocity of a wireless communication device in relation to a device located in a wireless network infrastructure;
   determining an integration interval to be used in measuring a power level at which a signal of the wireless communication system is received based on the velocity of the wireless communication device;
   measuring the power level of the signal of the wireless communication system received over a wireless channel between the wireless communication device and the device located in the wireless network infrastructure using the integration interval;
   determining adjustments to a transmit power level at which the signal of the wireless communication system is transmitted in accordance with the determined velocity of the wireless communication device,
   selecting between a first power control loop update frequency if the determined velocity satisfies a first predetermined criteria and a second power control loop update frequency if the determined velocity satisfies a second predetermined criteria, wherein the first predetermined criteria is that the velocity is equal to or less than a first velocity, and the second determined criteria is that the velocity is equal to or greater than a second velocity, and wherein the first power control loop update frequency is greater than the second power control loop update frequency; and
   providing the adjustments to the transmit power level and the selected one of first and second power control loop update frequencies to a transmitter of the signals.

10. A method as defined in claim 9, wherein determining the adjustments to the transmit power level at which the signal of the wireless communication system is transmitted results in a future desired received signal power level.

11. A method as defined in claim 9, wherein determining the velocity, determining the integration interval, measuring the power level, determining the adjustments to the transmit power level, and providing the adjustments to the transmitter are performed in the wireless communication device.

12. A method as defined in claim 9, wherein determining the velocity, determining the integration interval, measuring the power level, determining the adjustments to the transmit power level, and providing the adjustments to the transmitter are performed in the wireless network infrastructure.

13. A method as defined in claim 9, wherein the velocity of the wireless communication device is determined based on information from a navigational receiver.

14. A method as defined in claim 13, wherein the navigational receiver is a Global Positioning System receiver.

15. A method as defined in claim 9, wherein the velocity of the wireless communication device is determined in accordance with at least two location measurements of the wireless communication device, wherein the at least two location measurements are made at different, known times, and the velocity of the wireless communication device is based on the at least two location measurements and their respective measurement times.

16. A wireless communication device comprising:
   a navigational receiver configured to receive navigation data and to output a velocity of the wireless communication device;
   a receiver configured to receive signals from a wireless network infrastructure; and
   a controller configured
      to receive the velocity of the wireless communication device from the navigational receiver and a measurement of a power level of a received signal from the receiver;
      to determine adjustments to a transmitter; and
      to provide a selection between a first power control loop update frequency if the velocity satisfies a first predetermined criteria and a second power control loop update frequency if the velocity satisfies a second predetermined criteria, wherein the first predetermined criteria is that the velocity is equal to or less than a first velocity, and the second predetermined criteria is that the velocity is equal to or greater than a second velocity, and wherein the first power control loop update frequency is greater than the second power control loop update frequency.

17. A wireless communication device as defined in claim 16, wherein the navigational receiver is a Global Positioning System receiver.

18. A wireless communication device as defined in claim 16, wherein the transmitter to be adjusted is in the wireless communication device.

19. A wireless communication device as defined in claim 16, wherein the transmitter to be adjusted is in a device in a wireless network infrastructure.

20. A wireless network infrastructure device comprising:
a receiver configured to receive signals from a wireless communication device; and
a controller configured
to receive data indicating a velocity of the wireless communication device and a measurement of the power level of a received signal;
to determine adjustments to a transmitter; and
to select between a first power control loop update frequency if the velocity satisfies a first predetermined criteria and a second power control loop update frequency if the velocity satisfies a second predetermined criteria, wherein the first predetermined criteria is that the velocity is equal to or less than a first velocity, and the second predetermined criteria is that the velocity is equal to or greater than a second velocity, and wherein the first power control loop update frequency is greater than the second power control loop update frequency.

21. A wireless network infrastructure device as defined in claim 20, wherein the data indicating the velocity of the wireless communication device is received from the wireless communication device.

22. A wireless network infrastructure device as defined in claim 21, wherein the data indicating the velocity of the wireless communication device is determined by a Global Positioning System receiver.

23. A wireless network infrastructure device as defined in claim 20, wherein the data, indicating the velocity of the wireless communication device is determined in the wireless network infrastructure.

24. A wireless network infrastructure device as defined in claim 20, wherein the transmitter to be adjusted is in the wireless network infrastructure.

25. A wireless network infrastructure device as defined in claim 20, wherein the transmitter to be adjusted is in the wireless communication device.

26. A method of controlling transmitted power in a wireless communication system, the method comprising:
determining a velocity of a wireless communication device;
selecting between a first power control loop update frequency if the determined velocity satisfies a first predetermined criteria and a second power control loop update frequency if the determined velocity satisfies a second predetermined criteria, wherein the first predetermined criteria is that the velocity is equal to or less than a first velocity, and the second predetermined criteria is that the velocity is equal to or greater than a second velocity, and wherein the first power control loop update frequency is greater than the second power control loop update frequency;
measuring a power level of a received signal;
determining an adjustment to a power level of a transmitted signal, wherein the adjustment is based on the measured power level of the received signal;
sending the adjustments to a transmitter of the transmitted signal; and
updating a power control loop at the selected one of the first and second power control loop update frequencies.

27. A device comprising:
means for determining a location of a wireless communication device in relation to a device in a wireless network infrastructure;
means for determining adjustments to a transmit power level in accordance with the determined location; and
means for selecting between a first power control loop update frequency if the determined location satisfies a first predetermined criteria and a second power control loop update frequency if the determined location satisfies a second predetermined criteria, wherein the first predetermined criteria is that the velocity is equal to or less than a first velocity, and the second predetermined criteria is that the velocity is equal to or greater than a second velocity, and wherein the first power control loop update frequency is greater than the second power control loop update frequency.

28. The device of claim 27, wherein the device is a mobile communications device.

29. A wireless communication device comprising:
means for determining a velocity of the wireless communication device in relation to a device located in a wireless network infrastructure;
means for measuring a power level of a signal of the wireless communication system received over a wireless channel between the wireless communication device and the device located in the wireless network infrastructure;
means for determining adjustments to a transmit power level at which the signal of the wireless communication system is transmitted in accordance with the determined velocity of the wireless communication device;
means for selecting between a first power control loop update frequency if the determined velocity satisfies a first predetermined criteria and a second power control loop update frequency if the determined velocity satisfies a second predetermined criteria, wherein the first predetermined criteria is that the velocity is equal to or less than a first velocity, and the second predetermined criteria is that the velocity is equal to or greater than a second velocity, and wherein the first power control loop update frequency is greater than the second power control loop update frequency; and
means for providing the adjustments and the selected one of first and second power control loop update frequencies to a transmitter of the signal.

30. The method of claim 1, wherein the first velocity is equal to the second velocity.

* * * * *